(No Model.) 5 Sheets—Sheet 1.
W. B. LINDSAY, W. E. TONNER & A. LOWMILLER.
FILTER.
No. 528,104. Patented Oct. 23, 1894.
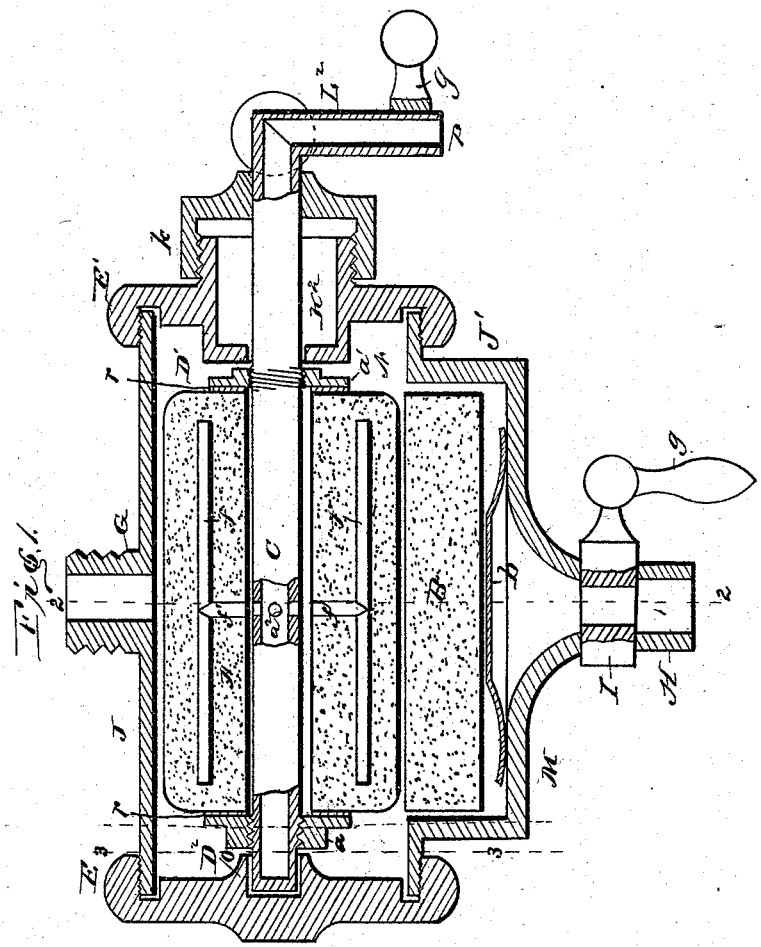
Witnesses.
J. M. Fowler Jr.
D. E. Squires
W. B. Lindsay
W. E. Tonner
A. Lowmiller
Inventors
By their Attorney (No Model.) 5 Sheets—Sheet 2.
W. B. LINDSAY, W. E. TONNER & A. LOWMILLER.
FILTER.
No. 528,104. Patented Oct. 23, 1894.
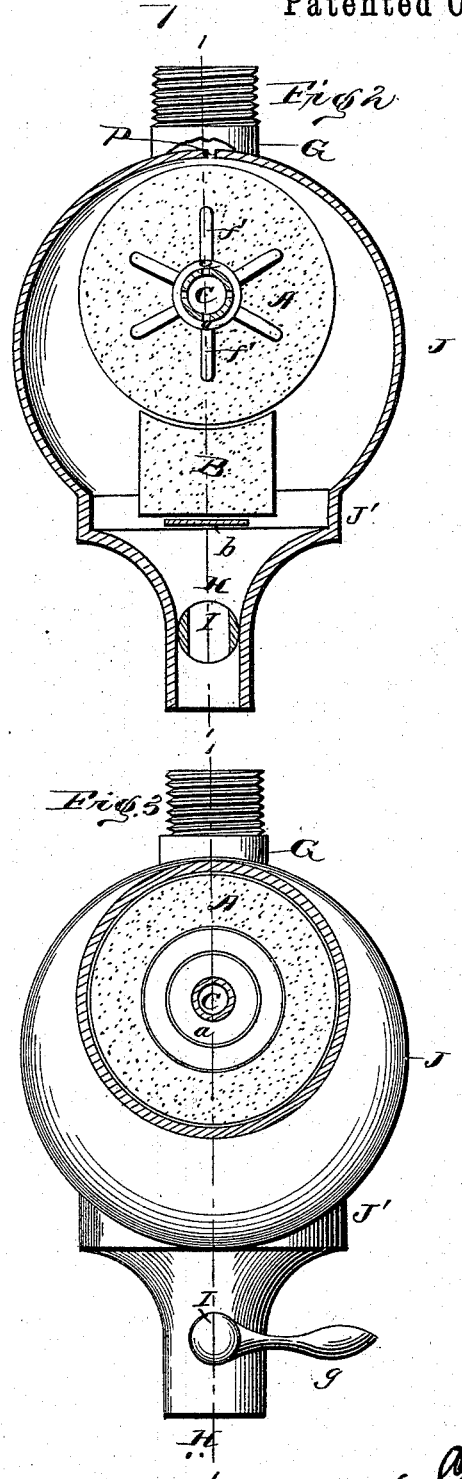
Witnesses.
J. M. Fowler Jr
D. E. Squires
W. B. Lindsay
W. E. Tonner
A. Lowmiller
Inventors
Chas. E. Barber
By their Attorney

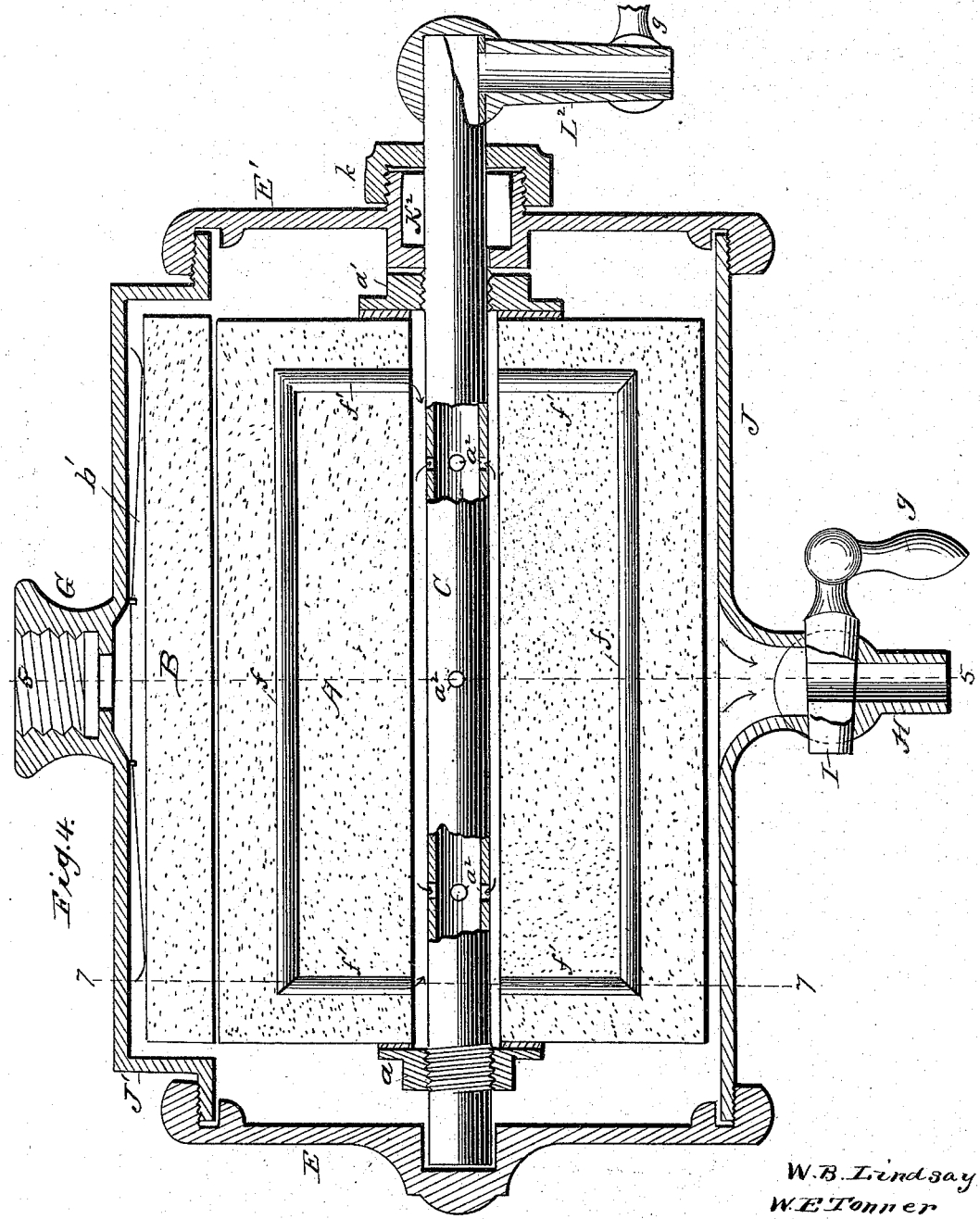

(No Model.) 5 Sheets—Sheet 4.
W. B. LINDSAY, W. E. TONNER & A. LOWMILLER.
FILTER.
No. 528,104. Patented Oct. 23, 1894.
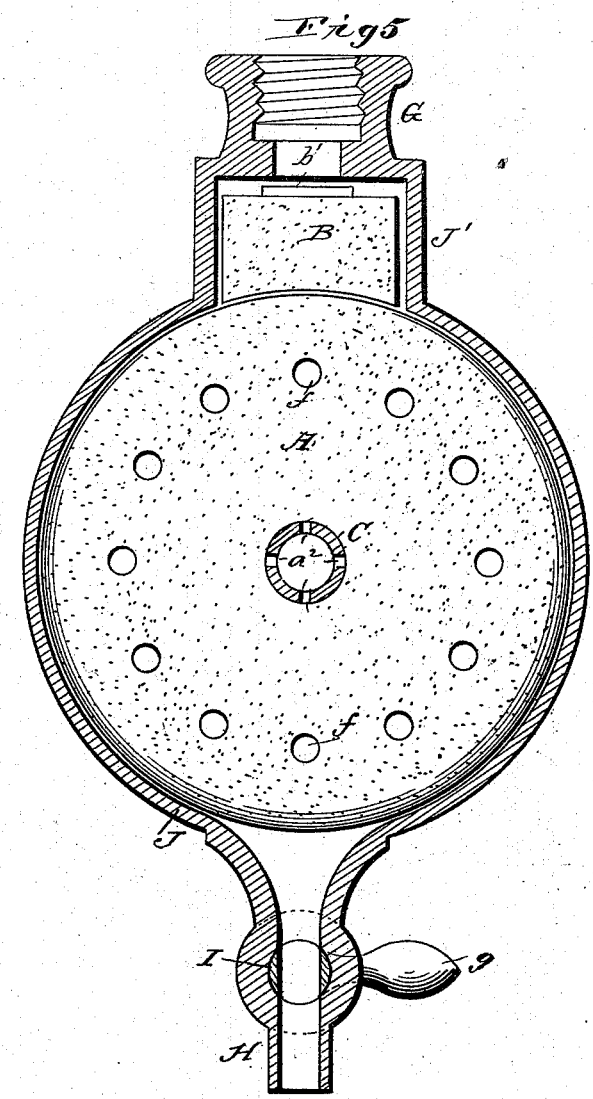
Witnesses.
J. M. Fowler Jr.
D. E. Squires
W. B. Lindsay
W. E. Tonner
A. Lowmiller
Inventors
By Chas. E. Barber
Their Attorney (No Model.) 5 Sheets—Sheet 5.
W. B. LINDSAY, W. E. TONNER & A. LOWMILLER.
FILTER.

No. 528,104. Patented Oct. 23, 1894.

Witnesses
J. M. Fowler Jr.
D. E. Squires

W. B. Lindsay
W. E. Tonner
A. Lowmiller
Inventors

By Chas. E. Barker
Their Attorney

UNITED STATES PATENT OFFICE.

WILLIAM B. LINDSAY, WILLIAM E. TONNER, AND ALPHEUS LOWMILLER, OF STEUBENVILLE, OHIO.

FILTER.

SPECIFICATION forming part of Letters Patent No. 528,104, dated October 23, 1894.

Application filed October 28, 1892. Serial No. 460,309. (No model.)

*To all whom it may concern:*

Be it known that we, WILLIAM B. LINDSAY, WILLIAM E. TONNER, and ALPHEUS LOW-MILLER, citizens of the United States, residing at Steubenville, in the county of Jefferson and State of Ohio, have invented certain new and useful Improvements in Filters, of which the following is a full and complete description, reference being had to the accompanying drawings, which form a part of this specification.

Figure 6:
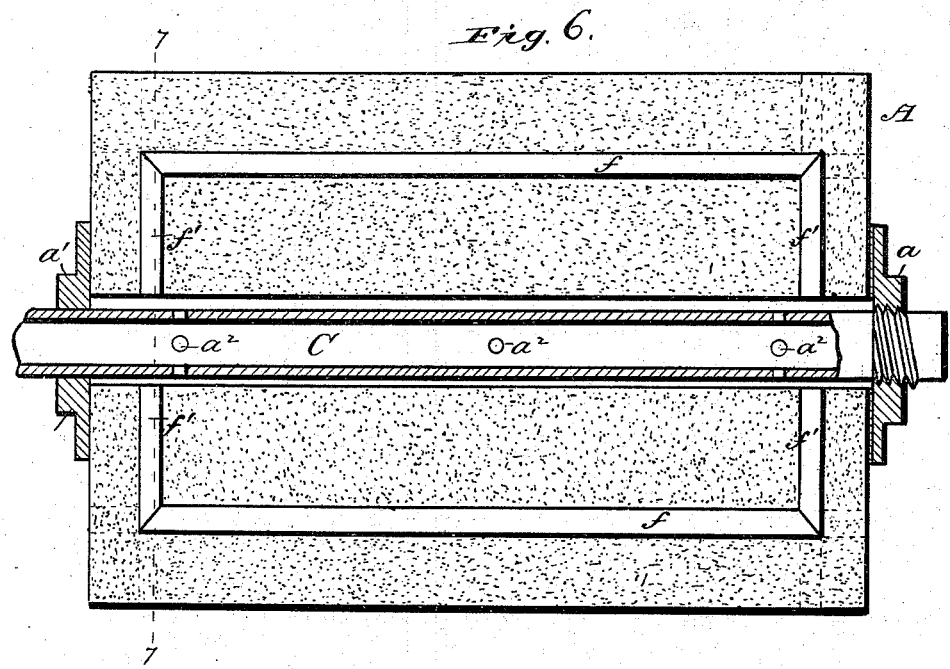
Figure 7:
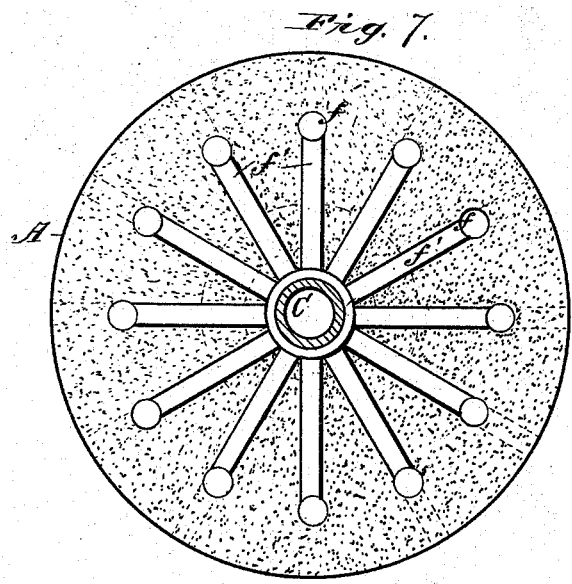

Figure 1 represents a central longitudinal section on the line 1—1 in Figs. 2 and 3. Fig. 2 is a vertical section on the line 2—2 in Fig. 1. Fig. 3 is a similar section on the line 3—3. Fig. 4 is a central longitudinal section, on an enlarged scale, of a slightly modified form of our filter. Fig. 5 is a transverse section on the line 5—5 of Fig. 4. Fig. 6 is a separate longitudinal sectional view of the filtering cylinder and its hollow support. Fig. 7 is a transverse section on line 7—7 in Figs. 4 and 6.

Referring to Figs. 1, 2, and 3, J designates a metal shell or case having its ends closed by removable caps E, E', in which a hollow rotatable shaft C has its bearings. The shell J has, at or near its mid-length, a radially projecting tubular neck G, which is adapted to be attached to a reservoir or supply pipe and on the opposite side is a radially projecting discharge nozzle H which is controlled by a cock or valve I, of which $g$ is the handle. Packing rings or gaskets $r$ are interposed between the ends of the cylinder A and the clamping nuts, $a$, $a'$, to form tight joints for preventing unfiltered fluid from finding its way into the interior of the cylinder.

A designates the filter proper which is made of any suitable porous material in the form of an integral hollow cylinder and is mounted on the shaft C, within the shell J, being firmly held by clamping nuts $a$, $a'$, which cause it to rotate with the shaft when the latter is rotated. The central opening through the cylinder is somewhat larger in diameter than the shaft C, so that when the cylinder is fixed concentrically on the shaft there will be an annular space between the two through which the water or other fluid, after percolating through the walls of the cylinder from the outside, may pass freely to small perforations $a^2$ in the shaft and into the latter.

With the view of increasing the capacity of the filter without unduly enlarging its size, we form in the walls of the cylinder A, around the central or axial opening, a series of longitudinal chambers $f$, which communicate with the central opening through radial passages $f'$. The chambers may be as close together, and arranged in such relation to each other as may be found desirable or expedient, and instead of a single passage $f'$ connecting each chamber with the central chamber, there may be any desirable number.

The fluid percolating through the body of the cylinder first finds its way into the chambers and passages $f, f'$, and being free to enter these from all directions, it follows that the filtering capacity of the cylinder is greater than it would be without them.

The cap E is provided in its inner face with a central socket $o$, which does not extend entirely through, and which receives, and forms a bearing for, the end of the shaft C. The cap E' has the shaft bearing extending entirely through it, and is provided with a stuffing box K² and a gland $k$, whereby provision is made for packing the shaft to prevent the escape of fluid through the bearing. The shaft, which projects entirely through the stuffing box and gland, has its projecting end bent at right angles to form a crank L²; or if preferred a separate hollow crank, open at its outer end may be applied to the straight end of the shaft in such a manner that the interior thereof will communicate with and form a continuation of the interior of the shaft. The crank is provided with a handle $g$, whereby it may be turned to rotate the shaft and the filtering cylinder thereon, and its outer end is open as represented at $p$, Fig. 1, and forms the outlet through which the filtered water is discharged or drawn off. While the shaft is rotatable in its bearings, it is not movable in a longitudinal direction through the cap E', being held in place by the crank L, and collar $a'$ whereby it is attached to the cap so as to be movable only with the latter.

From the foregoing it will be understood that when for any reason, it is necessary or desirable to remove the filtering cylinder from its case, it is only necessary to unscrew the cap E' when the shaft and cylinder may be withdrawn together without further separation of any of the parts.

At the bottom of the shell J is a longitudinal pocket J', from the bottom of which the outlet H leads, in which pocket is a scouring or cleansing block B which is supported and pressed against the filtering cylinder A by a spring b. This block may be made of any suitable material, as for instance, stone, or burnt clay, and its purpose is to scour and cleanse the surface of the filtering cylinder when the latter becomes fouled or coated with impurities filtered out of the water or other fluid passing through the filter.

The scouring or cleansing is effected by taking hold of the handle g and turning the shaft C and the filtering cylinder mounted thereon, the surface of the cylinder rubbing against the block B, whereby any accumulation on the cylinder is rubbed or ground off. During this operation the cock I should be open and the water turned on, so that as the dirt and impurities are loosened by the grinding or scouring action they will be washed off and carried away by the current of water passing through.

The operation of the apparatus thus described is as follows: The filter being connected to a reservoir or supply pipe and the cock I closed the water or other fluid entering through the neck G, percolates through the porous cylinder A into the chambers $f$, from which it passes freely through the passages $f'$ into the interior annular chamber around the shaft C, from thence through the perforations $a^2$, into the hollow shaft and from the latter through the crank $L^2$. When the cylinder A becomes fouled with impurities so that it no longer filters freely, it is cleansed in the manner above set forth, after which the cock I is closed and the filtering proceeds as before.

Manifestly, when it is not desired to filter the water the apparatus may be thrown out of operation by simply opening the cock I, when the water will pass unfiltered, through the shell J, around the cylinder A and out through the nozzle H.

Referring now to Figs. 4, 5, 6, and 7, the apparatus illustrated thereby is very similar to that above described, the main differences being that the water chambers $f$ are connected at both ends with the central shaft chamber by connecting passages $f'$, and the pocket J' in which the scouring block B is located instead of being formed at the bottom of the shell, as above described, is formed at the top so that the block B acts upon the filtering cylinder by gravity. We however, show in this case also a light spring $b'$ to assist gravity in holding the block down, the weight of the latter being hardly sufficient for rapid action. Manifestly however the spring may be dispensed with and gravity alone relied on, the essential feature being the grinding or scouring block applied to the cylinder regardless of the specific means for holding it in action.

This invention consists simply in the provision of a natural stone filtering cylinder and a natural stone rubber.

Having thus described our invention, we claim—

1. In a filtering apparatus, the combination of a shell or case having in its side walls oppositely disposed inlet and outlet passages, means for controlling the outlet, a hollow perforated shaft extending longitudinally within the case and projecting therefrom at one end, the projecting end provided with a hollow crank, a porous filtering cylinder mounted on the shaft within the case, and a scouring block supported within the case to bear against the filtering cylinder.

2. In a filtering apparatus the combination of a shell or case closed at one end by a removable cap having a central shaft bearing, the said shell having at the opposite end an interior socket to receive and support the end of a shaft, a hollow perforated shaft having one end seated in said socket and extending thence through and beyond the bearing, at the opposite end and connected with said cap to prevent independent longitudinal movement, a filtering cylinder fixed on the shaft and having an interior chamber around the same, a scouring block arranged within the case to bear against and scour the surface of the cylinder when the latter is rotated, and a crank on the projecting end of the shaft, whereby provision is made for withdrawing the cylinder from the case by simply removing the cap, and for replacing it, without further separation of parts.

3. In a filtering apparatus the combination with the shell or case having inlet and outlet passages and adapted to be attached to a reservoir or supply pipe, of the removable end cap E', the hollow perforated shaft C extending longitudinally within the case and projecting through the cap E', the filtering cylinder mounted on the shaft within the case and having an interior chamber around the shaft, the hollow crank on the projecting end of the shaft forming an outlet from the latter, a filtering cylinder fixed on the shaft within the case and a scouring block arranged to bear against the surface of the cylinder to scour the latter.

4. An integral filtering block, comprising an integral hollow cylinder open at both ends, and having within its body portion a series of chambers disposed at intervals around the hollow center, and radial passages connecting said chambers with the central chamber.

5. An integral filtering block comprising a hollow cylinder open at both ends and having within its body portion a series of longitudinal chambers disposed at intervals around the hollow center and parallel therewith, and radial passages connecting said chambers at both ends with the interior or central chamber.

6. As an improvement in filters and cleaners, the combination of a filtering medium of natural stone with a rubber or cleaner made of natural stone and adapted to scour the surface of the filtering medium.

In testimony whereof we affix our signatures in the presence of witnesses.

WILLIAM B. LINDSAY.
WILLIAM E. TONNER.
ALPHEUS LOWMILLER.

Witnesses as to Lindsay:
D. E. SQUIRES,
CHAS. E. BARBER.

Witnesses as to Tonner and Lowmiller:
O. F. KEMMER,
H. H. PICKER.